(12) United States Patent
Yano et al.

(10) Patent No.: US 7,656,116 B2
(45) Date of Patent: Feb. 2, 2010

(54) POWER SUPPLY SYSTEM WITH FUNCTION OF SHORT CIRCUIT DETECTION

(75) Inventors: Takehiro Yano, Osaka (JP); Tetsu Nagano, Osaka (JP); Daisuke Fukuda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/181,733

(22) Filed: Jul. 29, 2008

(65) Prior Publication Data

US 2009/0033268 A1 Feb. 5, 2009

(30) Foreign Application Priority Data

Jul. 31, 2007 (JP) .............................. 2007-199364

(51) Int. Cl.
*H02P 27/04* (2006.01)
(52) U.S. Cl. ...................................... 318/801; 318/812
(58) Field of Classification Search ................. 318/811, 318/599, 798, 801, 805, 812
See application file for complete search history.

(56) References Cited

U.S. PATENT DOCUMENTS

| | | | |
|---|---|---|---|
| 5,430,636 | A | 7/1995 | Kachi |
| 6,114,826 | A * | 9/2000 | Nishiura et al. ............. 318/685 |
| 6,268,986 | B1 * | 7/2001 | Kobayashi et al. ............ 361/24 |
| 6,757,674 | B2 * | 6/2004 | Wiens et al. .................... 707/3 |
| 6,907,334 | B2 * | 6/2005 | Yoshida et al. ................ 701/41 |
| 7,126,296 | B1 * | 10/2006 | Burlak et al. ................ 318/280 |
| 2006/0091722 | A1 | 5/2006 | Watanabe et al. | |

FOREIGN PATENT DOCUMENTS

| | | |
|---|---|---|
| JP | 6-69732 | 3/1994 |
| JP | 2004-212201 | 7/2004 |
| JP | 2005-252763 | 9/2005 |

* cited by examiner

*Primary Examiner*—Rina I Duda
(74) *Attorney, Agent, or Firm*—Hamre, Schumann, Mueller & Larson, P.C.

(57) ABSTRACT

There are provided upper and lower switching elements 1U to 1W and 2U to 2W for energizing motor drive windings 4U to 4W, a control circuit 20 that starts outputting a control signal for energization based on an energization instruction, pre-drive circuits 8U to 8W and 9U to 9W for controlling ON/OFF of the upper and lower switching elements based on the control signal, and short circuit detection circuits 10U to 10W for detecting short circuits in a node 14 between the upper and lower switching elements to higher-potential and lower-potential power sources based on the control signal and a voltage of the node. The short circuit detection circuits are controlled to detect a short circuit in the node to the lower-potential power source with all the upper switching elements turned ON and all the lower switching elements turned OFF and to detect a short circuit in the node to the higher-potential power source with all the upper switching elements turned OFF and all the lower switching elements turned ON, in a state where the motor drive windings are not energized. It is possible to prevent a situation in which a short circuit cannot be detected depending on a resistance component of a drive target.

7 Claims, 10 Drawing Sheets

POWER SUPPLY SYSTEM WITH FUNCTION OF SHORT CIRCUIT DETECTION

BACKGROUND OF THE INVENTION

1. Field of the Invention

The present invention relates to protection of a switching element for controlling the power supply to a motor drive winding from a short circuit.

2. Description of Related Art

In a switching IC for driving a winding of a motor by application of a relatively large current, the switching element sometimes is overloaded and broken down due to a short circuit between an output terminal and a GND terminal of a switching element (hereinafter, referred to as a "ground fault") or a short circuit between the output terminal and a power terminal of the switching element (hereinafter, referred to as a "power supply fault") that is caused by, for example, a solder bridge created when the IC is mounted on a substrate.

As a solution to this problem, an exemplary power supply circuit provided with a short circuit protection control device is disclosed in JP 2005-252763 A. FIG. 6 is a block circuit diagram showing an exemplary configuration of the conventional power supply circuit. This circuit is divided into a short circuit protection control device 1 and a switching circuit 2. An upper switching element 3 and a lower switching element 4 with a MOS structure are connected in series between a power source VM and GND. An upper pre-drive circuit 6 is connected to a gate of the upper switching element 3, and a lower pre-drive circuit 8 is connected to a gate of the lower switching element 4. The upper pre-drive circuit 6 turns the upper switching element 3 ON/OFF based on an upper control signal 5. The lower pre-drive circuit 8 turns the lower switching element 4 ON/OFF based on a lower control signal 7.

Further, an upper breaking circuit 9 and a lower breaking circuit 10 for respectively turning the upper switching element 3 and the lower switching element 4 OFF are connected to the gates of the respective switching elements 3 and 4. The upper breaking circuit 9 and the lower breaking circuit 10 are controlled by output signals of a ground fault detection circuit 11 and a power supply fault detection circuit 12, respectively.

The ground fault detection circuit 11 includes a two-input ground fault detection comparator 13 whose positive-side input is supplied with an arbitrary voltage V1 and whose negative-side input is connected with a node 14 between the upper switching element 3 and the lower switching element 4. Further, the ground fault detection comparator 13 is supplied with a power source VC via a switch SW1. In a state where the switch SW1 is turned ON, so that the power source VC is supplied to the ground fault detection comparator 13, when the voltage of the node 14 is lower than the voltage V1, the ground fault detection comparator 13 causes the upper breaking circuit 9 to turn OFF the upper switching element 3.

The power supply fault detection circuit 12 similarly includes a two-input power supply fault detection comparator 16 whose positive-side input is supplied with an arbitrary voltage V2 and whose negative-side input is connected with the node 14. Further, the power supply fault detection comparator 16 is supplied with a power source VC via a switch SW2. In a state where the switch SW2 is turned ON, so that the power source VC is supplied to the power supply fault detection comparator 16, when the voltage of the node 14 is higher than the voltage V2, the power supply fault detection comparator 16 causes the lower breaking circuit 10 to turn OFF the lower switching element 4.

Further, an upper current monitor circuit 15 and a lower current monitor circuit 17 are connected to the gates of the upper switching element 3 and the lower switching element 4, respectively. The switch SW1 is turned ON/OFF based on an output of the upper current monitor circuit 15, thereby controlling the supply of the power source VC for operating the ground fault detection comparator 13. More specifically, when a current value of the upper switching element 3 is not less than a level at which the switching element 3 is assumed to be broken down, the switch SW1 is turned ON, so that the ground fault detection comparator 13 is supplied with the power source VC to be operated. On the other hand, when the current value is below such a level, the switch SW1 is turned OFF, so that the ground fault detection comparator 13 is not supplied with the power source VC and is in a non-operating state. Accordingly, the upper breaking circuit 9 is not operated, resulting in a normal operation of the upper switching element 3.

Meanwhile, the power source VC for operating the power supply fault detection comparator 16 is controlled by the switch SW2 based on an output of the lower current monitor circuit 17. More specifically, when a current value of the lower switching element 4 is not less than a level at which the switching element 4 is assumed to be broken down, the switch SW2 is turned ON, so that the power supply fault detection circuit 12 is supplied with the power source VC to be operated. On the other hand, when the current value is below such a level, the switch SW2 is turned OFF, so that the power supply fault detection circuit 12 is not supplied with the power source VC and is in a non-operating state. Accordingly, the lower breaking circuit 10 is not operated, resulting in a normal operation of the lower switching element 4.

With the above-described circuit configuration in mind, consideration is given to the case where the node 14 is short-circuited to ground when the upper switching element 3 is ON. FIG. 7 shows the case where the node 14 is short-circuited to ground.

At this time, since the output terminal (node 14) is short-circuited to ground and has a GND potential, an excess current of an amount of (power source VM)/(ON-resistance of upper switching element 3) flows through the upper switching element 3 toward the node 14 as a point of ground fault. In other words, the upper switching element 3 carries an unexpected overload. Thus, the upper current monitor circuit 15 detects the excess current, and turns the switch SW1 ON, so that the power source VC is supplied to the ground fault detection comparator 13.

Meanwhile, the power supply fault detection comparator 16 is in a non-operating state since no current flows through the switching element 4 and the switch SW2 is turned OFF by the lower current monitor circuit 17.

Since the node 14 is short-circuited to ground, a voltage of substantially 0 is input to the negative-side input of the ground fault detection comparator 13. In the case where the voltage V1 to be supplied to the positive-side input is the power source VM/2, for example, the ground fault detection comparator 13 is supplied with a higher voltage to the positive-side input than to the negative-side input. Accordingly, the upper breaking circuit 9 is operated and turns the upper switching element 3 OFF. Consequently, the excess current flowing through the upper switching element 3 is interrupted, thereby preventing a breakdown of the upper switching element 3 due to the excess current.

On the other hand, consideration is given to the case where the node 14 is short-circuited to the power supply (power source VM) when the lower switching element 4 is ON. FIG. 8 shows the case where the node 14 is short-circuited to the power supply.

At this time, since the output terminal (node 14) is short-circuited to the power supply and has a potential VM, an excess current of an amount of (power source VM)/(ON-resistance of lower switching element 4) flows through the lower switching element 4 from the node 14 as a point of power supply fault. In other words, the lower switching element 4 carries an unexpected overload. Thus, the lower current monitor circuit 17 detects the excess current, and turns the switch SW2 ON, so that the power source VC is supplied to the power supply fault detection comparator 16.

Meanwhile, the ground fault detection comparator 13 is in a non-operating state since no current flows through the switching element 3 and the switch SW1 is turned OFF by the upper current monitor circuit 15.

Since the node 14 is short-circuited to the power supply, substantially the same voltage as that of the power source VM is supplied to the positive-side input of the power supply fault detection comparator 16. In the case where the voltage V2 to be supplied to the negative-side input is the power source VM/2, for example, the power supply fault detection comparator 16 is supplied with a higher voltage to the positive-side input than to the negative-side input. Accordingly, the lower breaking circuit 10 is operated and turns the lower switching element 4 OFF. Consequently, the excess current flowing through the lower switching element 4 is interrupted, thereby preventing a breakdown of the lower switching element 4 due to the excess current.

Next, a description will be given of the case where motor drive windings of three phases are to be driven by the switching elements, with reference to the drawings. FIG. 9 is a block circuit diagram showing an exemplary configuration of the conventional short circuit protection control device in the case where motor drive windings of three phases, i.e., the U-phase, the V-phase, and the W-phase, are to be driven.

In FIG. 9, a three-phase bridge circuit including upper switching elements 1U, 1V, and 1W and lower switching elements 2U, 2V, and 2W for the U-phase, the V-phase, and the W-phase is configured between a power source VM and GND. Their output terminals 3U, 3V, and 3W are connected with motor drive windings 4U, 4V, and 4W to be driven. RU, RV, and RW represent resistance components of the respective windings.

Circuits for driving the upper switching elements 1U, 1V, and 1W and the lower switching elements 2U, 2V, and 2W for the U-phase, the V-phase, and the W-phase each have the same configuration as that of the above-described short circuit protection control device 1, and short circuit protection control devices 5U, 5V, and 5W are provided respectively for the U-phase, the V-phase, and the W-phase. The following description is directed only to a specific configuration of the short circuit protection control device 5U.

The short circuit protection control devices 5U, 5V, and 5W are turned ON/OFF based on U-phase, V-phase, and W-phase upper control signals 6U, 6V, and 6W and U-phase, V-phase, and W-phase lower control signals 7U, 7V, and 7W, respectively. Since the configuration and operation of each of the short circuit protection control devices 5U, 5V, and 5W are the same as those of the above-described short circuit protection control device 1, descriptions thereof will be omitted.

With the above-described circuit configuration in mind, consideration is given to the case where energization of the motor drive windings 4U, 4V, and 4W is started with the U-phase upper switching element 1U and the W-phase lower switching element 2W turned ON from a non-energized state and then the output terminal 3W is short-circuited to ground (GND). FIG. 10 shows the case where the node 3W is short-circuited to ground.

As shown by a broken line in FIG. 10, a current flows from the U-phase upper switching element 1U through the motor drive windings 4U and 4W to the point of W-phase ground fault.

At this time, since the output terminal 3W is short-circuited to ground and has a GND potential, an excess current of VM/(Ron+RU+RW), where Ron is an ON resistance of the U-phase upper switching element 1U, flows through the U-phase upper switching element 1U. As a result, the U-phase upper switching element 1U carries an unexpected overloaded. Thus, the upper current monitor circuit 15 detects the excess current, and turns the switch SW1 ON, so that the power source VC is supplied to the ground fault detection comparator 13.

The voltage of the output terminal 3U to be input to the ground fault detection comparator 13 is expressed by (RU+RW)/(Ron+RU+RW)×VM. For example, when the winding resistance RU or RW of the motor drive winding is sufficiently lower than the resistance Ron, the voltage of the output terminal 3U is substantially equal to the GND voltage, and the upper breaking circuit 9 is operated by the ground fault detection comparator 13 so as to turn the U-phase upper switching element 1U OFF. Consequently, the excess current flowing through the U-phase upper switching element 1U is interrupted, thereby preventing a breakdown of the U-phase upper switching element 1U.

However, in the case where the winding resistance RU or RW is sufficiently higher than the ON-resistance Ron of the U-phase upper switching element 1U, the voltage of the output terminal 3U is substantially equal to the power source VM. Since the ground fault detection comparator 13 is supplied with VM/2 to the positive-side input and the power source VM to the negative-side input, the upper breaking circuit 9 is not operated despite the fact that the output terminal 3W is short-circuited to ground, and thus the U-phase upper switching element 1U remains in an ON state. As a result, the U-phase upper switching element 1U could be overloaded continuously and broken down, and energization of the motor drive winding could be started in an abnormal state where the output terminal 3U is short-circuited to ground.

As described above, in the exemplary conventional configuration, detection of a ground fault depends on the resistance component of the drive target, which sometimes makes it impossible to detect a ground fault.

SUMMARY OF THE INVENTION

The present invention has been conceived to solve the conventional problem as described above, and it is an object of the present invention to provide a power supply system that can prevent a situation in which a short circuit cannot be detected because the detection of a short circuit depends on a resistance component of a drive target, thereby avoiding a breakdown of a power transistor.

In order to achieve the above-described object, a power supply system according to the present invention includes: a pair or a plurality of pairs of an upper switching element and a lower switching element connected in series between power sources for sequentially energizing a motor drive winding of a single phase or a plurality of phases; a control circuit that starts outputting a control signal for controlling energization of the motor drive winding based on an energization instruction; a pre-drive circuit for controlling ON/OFF of the upper switching element and the lower switching element based on the control signal from the control circuit; and a short circuit detection circuit for detecting a short circuit in a node between the upper switching element and the lower switching element to a higher-potential power source or a lower-potential power source based on the control signal from the control circuit and a voltage of the node. The short circuit detection circuit is controlled to perform at least one operation of: detecting a short circuit in the node to the lower-potential power source with all the upper switching element turned ON and all the lower switching element turned OFF; and detecting a short circuit in the node to the higher-potential power source with all the upper switching element turned OFF and all the lower switching element turned ON, in a state where the motor drive winding is not energized.

According to the power supply system with the above-described configuration, the operation of detecting a short circuit is performed with one of the upper switching element and the lower switching element collectively turned ON in a state where the motor drive winding is not energized. Therefore, it is possible to detect a ground fault and a power supply fault reliably without depending on a resistance component of the motor drive winding.

DETAILED DESCRIPTION OF THE INVENTION

Based on the above-described configuration, the power supply system of the present invention can assume the following various embodiments.

Preferably, when a short circuit in the node to the higher-potential power source or the lower-potential power source is detected, all the upper switching element and the lower switching element are turned OFF.

Preferably, when a short circuit in the node to the higher-potential power source or the lower-potential power source is detected, energization of the motor drive winding is prohibited.

Preferably, before energization of the motor drive winding is started by the upper switching element and the lower switching element, the short circuit detection circuit detects short circuits in the node to the higher-potential power source and the lower-potential power source. Since a short circuit in the switching element is detected before energization of the motor drive winding is started, it is possible to prevent energization in an abnormal state where the switching element is short-circuited.

Preferably, there is provided a protection circuit that turns all the upper switching element and the lower switching element OFF until a voltage of a power source of a short circuit protection control device including the control circuit, the pre-drive circuit, and the short circuit detection circuit is increased to an arbitrary voltage V1, and when the voltage of the power source of the short circuit protection control device is increased to not less than the arbitrary voltage V1, the short circuit detection circuit is controlled to perform at least one operation of: detecting a short circuit in the node to the lower-potential power source; and detecting a short circuit in the node to the higher-potential power source. With this configuration, the presence of a short circuit is checked only when the power source is started up, and thus it is possible to reduce a starting time of the motor.

In the above-described configuration, preferably, when a short circuit in the node to the higher-potential power source or the lower-potential power source is detected, all the upper switching element and the lower switching element are turned OFF.

Preferably, when a short circuit in the node to the higher-potential power source or the lower-potential power source is detected, energization of the motor drive winding is prohibited.

Hereinafter, power supply systems according to embodiments of the present invention will be described specifically with reference to the drawings.

EMBODIMENT 1

Figure 1:
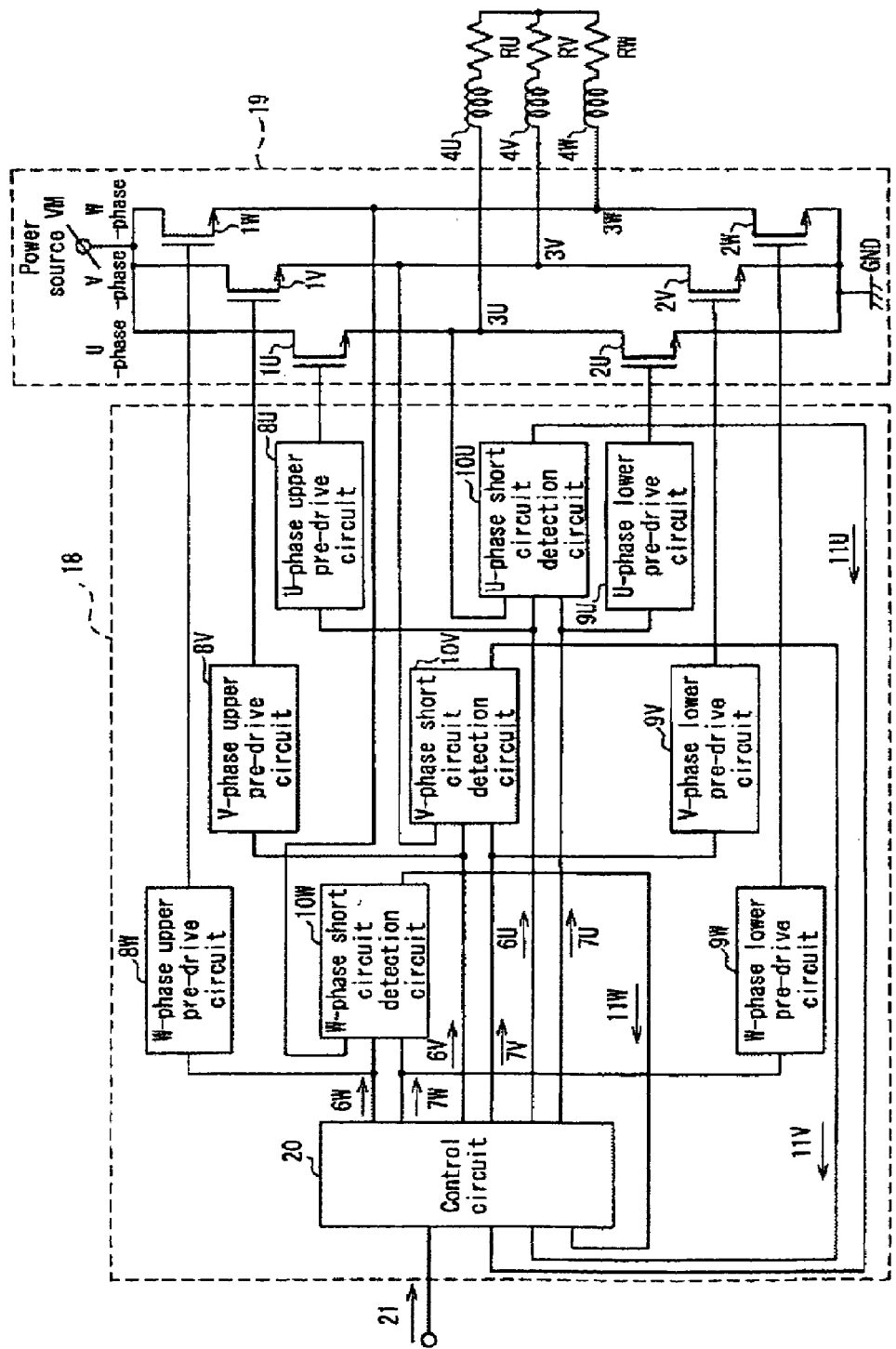
FIG. 1 is a block diagram showing an exemplary configuration of a power supply system according to Embodiment 1 of the present invention.

FIG. 1 is a block diagram showing an exemplary configuration of a power supply system according to Embodiment 1 of the present invention. This circuit includes a short circuit protection control device 18 and a switching circuit 19.

In the switching circuit 19, a three-phase bridge circuit including upper switching elements 1U, 1V, and 1W and lower switching elements 2U, 2V, and 2W for the U-phase, the V-phase, and the W-phase is configured between a power source VM and GND. Their output terminals 3U, 3V, and 3W are connected with motor drive windings 4U, 4V, and 4W to be driven. RU, RV, and RW represent resistance components of the respective windings.

U-phase, V-phase, and W-phase upper pre-drive circuits 8U, 8V, and 8W are connected to gates of the U-phase, V-phase, and W-phase upper switching elements 1U, 1V, and 1W, respectively. The U-phase, V-phase, and W-phase upper pre-drive circuits 8U, 8V, and 8W respectively turn the U-phase, V-phase, and W-phase upper switching elements 1U, 1V, and 1W ON/OFF based on respective U-phase, V-phase, and W-phase upper control signals 6U, 6V, and 6W output from a control circuit 20.

U-phase, V-phase, and W-phase lower pre-drive circuits 9U, 9V, and 9W are connected to gates of the U-phase, V-phase, and W-phase lower switching elements 2U, 2V, and 2W, respectively. The U-phase, V-phase, and W-phase lower pre-drive circuits 9U, 9V, and 9W respectively turn the U-phase, V-phase, and W-phase lower switching elements 2U, 2V, and 2W ON/OFF based on respective U-phase, V-phase, and W-phase lower control signals 7U, 7V, and 7W.

Each of the U-phase, V-phase, and W-phase upper control signals 6U, 6V, and 6W and the U-phase, V-phase, and W-phase lower control signals 7U, 7V, and 7W is a signal that repeats a high level (hereinafter, referred to as "H") and a low level (hereinafter, referred to as "L"). When the signal is H, the switching element to be driven is turned ON, and when the signal is L, the switching element is turned OFF.

The short circuit protection control device 18 includes U-phase, V-phase, and W-phase short circuit detection circuits 10U, 10V, and 10W. The U-phase short circuit detection circuit 10U receives the U-phase upper control signal 6U, the U-phase lower control signal 7U, and an output of the output terminal 3U, and outputs a U-phase short circuit detection signal 11U to the control circuit 20. Similarly, the V-phase and W-phase short circuit detection circuits 10V and 10W respectively receive the V-phase and W-phase upper control signals 6V and 6W, the V-phase and W-phase lower control signals 7V and 7W, and outputs of the output terminals 3V and 3W, and respectively output V-phase and W-phase short circuit detection signals 11V and 11W to the control circuit 20.

Next, the configuration and operation of each of the U-phase, V-phase, and W-phase short circuit detection circuits 10U, 10V, and 10W will be described with reference to FIG. 2. Since the U-phase, V-phase, and W-phase short circuit detection circuits 10U, 10V, and 10W each have the same configuration, the following description is directed only to the U-phase short circuit detection circuit 10U. It should be noted that each component of an internal circuit of the V-phase and W-phase short circuit detection circuits 10V and 10W is denoted with the same reference numeral as that for the U-phase short circuit detection circuit 10U except that "U" is replaced by "V" and "W", respectively.

The configuration of the U-phase short circuit detection circuit 10U will be described with reference to FIG. 2. The U-phase short circuit detection circuit 10U includes a U-phase ground fault detection circuit 12U for detecting a ground fault in the output terminal 3U, a U-phase power supply fault detection circuit 13U for detecting a power supply fault in the output terminal 3U, a two-input OR circuit 14U, and a signal mask circuit 15U.

The U-phase ground fault detection circuit 12U includes a two-input ground fault detection comparator 16U and a two-input AND circuit 17U. Further, the U-phase power supply fault detection circuit 13U includes a two-input power supply fault detection comparator 18U and a two-input AND circuit 19U.

The ground fault detection comparator 16U is supplied with an arbitrary voltage VU1 to a positive-side input and the output signal of the output terminal 3U to a negative-side input, and supplies an output signal 20U to one input of the AND circuit 17U. The power supply fault detection comparator 18U is supplied with the output signal of the output terminal 3U to a positive-side input and an arbitrary voltage VU2 to a negative-side input, and supplies an output signal 21U to one input of the AND circuit 19U. The output signal from each of the ground fault detection comparator 16U and the power supply fault detection comparator 18U is H when the voltage of the positive-side input is higher than that of the negative-side input, and the output signal is L when the voltage of the positive-side input is lower than that of the negative-side input.

In the U-phase ground fault detection circuit 12U, the AND circuit 17U receives the U-phase upper control signal 6U to the other input. An output signal 22U of the AND circuit 17U is supplied to one input of the OR circuit 14U. In the U-phase power supply fault detection circuit 13U, the AND circuit 19U receives the U-phase lower control signal 7U to the other input. An output signal 23U of the AND circuit 19U is supplied to the other input of the OR circuit 14U.

The signal mask circuit 15U receives an output signal 24U of the OR circuit 14U, and outputs the U-phase short circuit detection signal 11U to the control circuit 20. The signal mask circuit 15U is a circuit for masking a signal within an arbitrary time T1 from switching of the output signal 24U from L to H or from H to L. The signal mask circuit 15U functions as follows. For example, the U-phase upper control signal 6U is switched from L to H so as to allow the U-phase upper switching element 1U to be turned from OFF to ON. However, immediately after the switching of the U-phase upper control signal 6U from L to H, the U-phase upper switching element 1U still remains OFF, and accordingly the output terminal 3U still has a low potential. For this reason, an apparent ground-fault-like state is created instantaneously. Afterwards, when the U-phase upper switching element 1U is turned ON, the potential of the output terminal 3U is increased to substantially the same level as that of the power source VM, and the apparent ground-fault-like state is eliminated. The signal mask circuit 15U masks a signal so that the circuit does not detect such an apparent ground-fault-like state as a short circuit. It should be noted that the input and output of the mask circuit 15 have the same polarity when no signal is masked.

The U-phase short circuit detection signal 11U is H when a short circuit in the output terminal 3U is detected, and it is L when no short circuit is detected. More specifically, when the output signal 22U or the output signal 23U is steadily H, a ground fault or a power supply fault is detected, and thus the U-phase short circuit detection signal 11U of H is output to the control circuit 20.

The following is a description of the operation of the U-phase short circuit detection circuit 10U thus configured. First, consideration is given to the case where the U-phase upper control signal 6U is H and the U-phase lower control signal 7U is L, in other words, the case where the U-phase upper switching element 1U is turned ON and the U-phase lower switching element 2U is turned OFF.

In the U-phase ground fault detection circuit 12U, since the U-phase upper control signal 6U is H, the output signal 20U of the ground fault detection comparator 16U is output as it is as the output signal 22U of the AND circuit 17U. On the other hand, in the U-phase power supply fault detection circuit 13U, since the U-phase lower control signal 7U is L, the output signal 23U of L is output from the AND circuit 19U. Accordingly, the output signal 20U of the ground fault detection comparator 16U is output as it is as the U-phase short circuit detection signal 11U. Namely, when the U-phase upper switching element 1U is turned ON and the U-phase lower switching element 2U is turned OFF, a ground fault in the output terminal 3U is detected.

Under this condition, when the output terminal 3U is short-circuited to ground, i.e., GND, a voltage of 0 is input to the negative-side input of the ground fault detection comparator 16U. When the voltage of the positive-side input is set to be the power source VM/2, for example, the output signal 20U, the output signal 22U, and the output signal 24U are steadily H, and a ground fault is detected. Thus, the U-phase short circuit detection signal 11U of H is output to the control circuit 20.

On the other hand, when the output terminal 3U is not short-circuited to ground, the output terminal 3U has substantially the same potential as that of the power source VM since the U-phase upper switching element 1U is turned ON.

Accordingly, the power source VM is input to the negative-side input of the ground fault detection comparator 16U. Since a voltage of the power source VM/2 is input to the positive-side input, the output signal 20U and the output signal 22U are L. Further, since the output signal 23U of the U-phase power supply fault detection circuit 13U is L, the output signal 24U is L, and the U-phase short circuit detection signal 11U is also L.

Meanwhile, consideration is given to the case where the U-phase upper control signal 6U is L and the U-phase lower control signal 7U is H, in other words, the case where the U-phase upper switching element 1U is turned OFF and the U-phase lower switching element 2U is turned ON.

In the U-phase ground fault detection circuit 12U, since the U-phase upper control signal 6U is L, the output signal 22U of L is output from the AND circuit 17U. On the other hand, in the U-phase power supply fault detection circuit 13U, since the U-phase lower control signal 7U is H, the output signal 21U of the power supply fault detection comparator 18U is output as it is as the output signal 23U of the AND circuit 19U and the output signal 24U. Accordingly, the output signal 21U of the power supply fault detection comparator 18U is output as it is as the U-phase short circuit detection signal 11U. Namely, when the U-phase upper switching element 1U is turned OFF and the U-phase lower switching element 2U is turned ON, a power supply fault in the output terminal 3U is detected.

Under this condition, when the output terminal 3U is short-circuited to the power supply, i.e., the power source VM, the potential of the power source VM is input to the positive-side input of the power supply fault detection comparator 18U. Since a voltage of the power source VM/2 is input to the negative-side input, the output signal 21U, the output signal 23U, and the output signal 24U are steadily H, and a power supply fault is detected. Thus, the U-phase short circuit detection signal 11U of H is output to the control circuit 20.

On the other hand, when the output terminal 3U is not short-circuited to the power supply, the output terminal 3U has substantially the same voltage as that of GND since the U-phase lower switching element 2U is turned ON. Accordingly, a voltage of 0 is input to the positive-side input of the power supply fault detection comparator 18U. Since a voltage of the power source VM/2 is input to the negative-side input, the output signal 21U and the output signal 23U are L. Further, since the output signal 22U of the U-phase ground fault detection circuit 12U is L, the output signal 24U is L, and the U-phase short circuit detection signal 11U is also L.

Further, in the case where the U-phase upper control signal 6U is L and the U-phase lower control signal 7U is L, in other words, the case where both the U-phase upper switching element 1U and the U-phase lower switching element 2U are turned OFF, the output signal 22U and the output signal 23U are L, and accordingly the output signal 24 is L. Thus, the U-phase short circuit detection signal 11U is steadily L.

Next, a description will be given of the control circuit 20. As shown in FIG. 1, the control circuit 20 receives an instruction (hereinafter, referred to as an "energization instruction") 21 for starting energization of the motor drive windings 4U, 4V, and 4W as well as the U-phase, V-phase, and W-phase short circuit detection signals 11U, 11V, and 11W, and outputs the U-phase, V-phase, and W-phase upper control signals 6U, 6V, and 6W as well as the U-phase, V-phase, and W-phase lower control signals 7U, 7V, and 7W so as to control ON/OFF of the switching elements.

Figure 3:
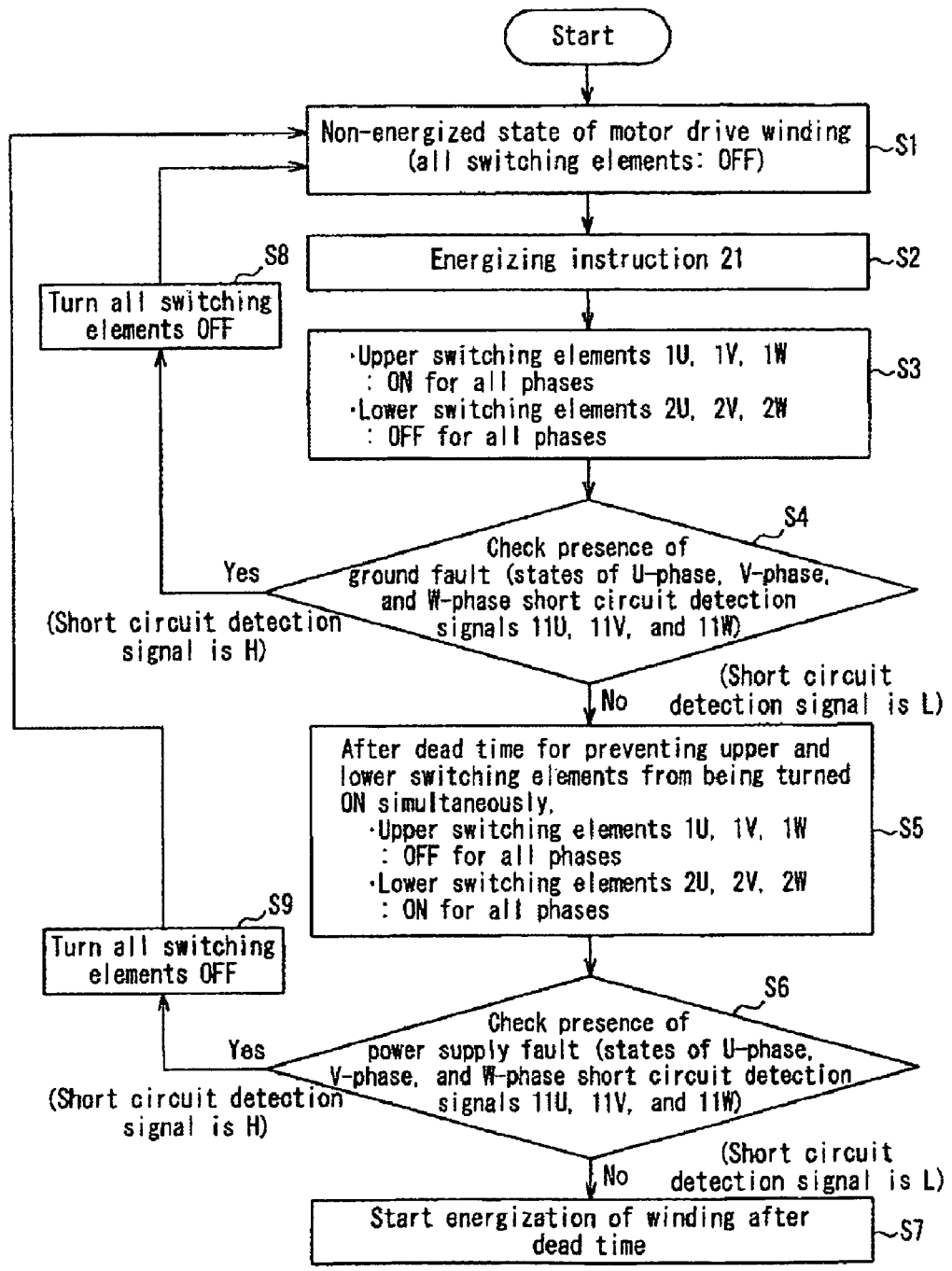
FIG. 3 is a flowchart showing a control operation of a control circuit 20 included in the power supply system.

Hereinafter, the operation of the control circuit 20 will be described with reference to a flowchart shown in FIG. 3. In a state where the motor drive windings 4U, 4V, and 4W are not energized (Step S1), upon receipt of the energization instruction 21 (Step S2), the control circuit 20 turns all the U-phase, V-phase, and W-phase upper switching elements 1U, 1V, and 1W ON and all the U-phase, V-phase, and W-phase lower switching elements 2U, 2V, and 2W OFF (Step S3). At this time, the U-phase, V-phase, and W-phase short circuit detection circuits 10U, 10V, and 10W check whether or not the respective output terminals 3U, 3V, and 3W are short-circuited to ground (Step S4).

When even only one ground fault is detected, in other words, when any of the U-phase, V-phase, and W-phase short circuit detection signals 11U, 11V, and 11W shows that a ground fault is detected, the control circuit 20 turns all the switching elements OFF (Step S8), so as to prevent a breakdown due to an excess current caused by the ground fault. When no ground fault is detected, after a lapse of a dead time provided for preventing the upper and lower switching elements from being turned ON simultaneously, the control circuit 20 turns all the U-phase, V-phase, and W-phase upper switching elements 1U, 1V, and 1W OFF and all the U-phase, V-phase, and W-phase lower switching elements 2U, 2V, and 2W ON (Step S5). At this time, the U-phase, V-phase, and W-phase short circuit detection circuits 10U, 10V, and 10W check whether or not the respective output terminals 3U, 3V, and 3W are short-circuited to the power supply (Step S6).

When even only one power supply fault is detected, in other words, when any of the U-phase, V-phase, and W-phase short circuit detection signals 11U, 11V, and 11W shows that a power supply fault is detected, the control circuit 20 turns all the switching elements OFF (Step S9), so as to prevent a breakdown due to an excess current caused by the power supply fault. When no power supply fault is detected, after a lapse of a dead time provided for preventing the upper and lower switching elements from being turned ON simultaneously, the control circuit 20 starts energizing the motor drive windings 4U, 4V, and 4W (Step S7).

According to the short circuit protection control device 18 of Embodiment 1 configured as described above, the above-described conventional problem can be solved. Namely, the conventional example has a problem in that in the case where the winding resistance RU or RW is sufficiently higher than the ON-resistance Ron of the U-phase upper switching element 1U, even when the output terminal 3W is short-circuited to ground, the ground fault cannot be detected, which causes an excess current to flow through the switching element continuously. However, such a conventional problem does not occur in the short circuit protection control device 18 configured as described above, as can be seen from the following description of the operation.

Initially, in a state where the motor drive windings 4U, 4V, and 4W are not energized, i.e., a state where all the switching elements are turned OFF (Step S1), when energization is started based on the energization instruction 21 (Step S2), the control circuit 20 makes the U-phase, V-phase, and W-phase upper control signals 6U, 6V, and 6W H so as to turn all the U-phase, V-phase, and W-phase upper switching elements 1U, 1V, and 1W ON, and makes the U-phase, V-phase, and W-phase lower control signals 7U, 7V, and 7W L so as to turn the U-phase, V-phase, and W-phase lower switching elements 2U, 2V, and 2W OFF (Step S3).

At this time, in the W-phase ground fault detection circuit 12W of the W-phase short circuit detection circuit 10W, since the voltage of the negative-side input of the ground fault detection comparator 16W, i.e., the output terminal 3W, is GND, and the voltage of the positive-side input is the power source VM/2, the output signal 20W is H. Consequently, since the AND circuit 17W receives the W-phase upper control signal 6W of H and the output signal 20W of H, the output signal 22W and the output signal 24W are H, which shows that a ground fault is detected. As a result, the W-phase short circuit detection signal 11W of H, which shows that a short circuit is detected, is output to the control circuit 20 (Step S4).

Consequently, the control circuit 20 is notified of the detection of a short circuit, and turns all the switching elements OFF (Step S8), thereby preventing a breakdown of the switching elements due to an excess current caused by the ground fault.

As described above, according to the short circuit protection control device 18 included in the power supply system of Embodiment 1, before energization of the motor drive windings 4U, 4V, and 4W is started, the presence of a ground fault is checked with all the upper switching elements 1U, 1V, and 1W turned ON. This makes it possible to detect a ground fault regardless of the resistance component of the motor drive windings to be driven, thereby protecting the switching elements from breakdowns. Further, since a ground fault is detected before energization of the motor drive windings is started, the motor drive windings are prevented from being driven in an abnormal state where a ground fault occurs, and abnormal energization of the motor drive windings 4U, 4V, and 4W also can be prevented.

Next, a description will be given of the case where an output terminal is short-circuited to the power supply in the short circuit protection control device 18 of Embodiment 1 configured as described above. The following description is directed to an exemplary case where the output terminal 3W is short-circuited to the power supply and the winding resistance is sufficiently higher than the ON-resistance of the switching element.

In a state where the motor drive windings are not energized, i.e., a state where all the switching elements are turned OFF (Step S1), when energization is started based on the energization instruction 21 (Step S2), the control circuit 20 makes the U-phase, V-phase, and W-phase upper control signals 6U, 6V, and 6W H so as to turn all the U-phase, V-phase, and W-phase upper switching elements 1U, 1V, and 1W ON, and makes the U-phase, V-phase, and W-phase lower control signals 7U, 7V, and 7W L so as to turn the U-phase, V-phase, and W-phase lower switching elements 2U, 2V, and 2W OFF (Step S3).

At this time, in the W-phase ground fault detection circuit 12W of the W-phase short circuit detection circuit 10W, since the negative-side input of the ground fault detection comparator 16W, i.e., the output terminal 3W, is short-circuited to the power source VM, its voltage is VM. Since the voltage of the positive-side input is the power source VM/2, the output signal 20W is L, and the output signal 22W is also L. On the other hand, in the W-phase power supply fault detection circuit 13W, since the W-phase lower control signal 7W is L, the output signal 23W is L. Accordingly, the output signal 24W is also L, and the W-phase short circuit detection signal 11W is L.

With regard to the U-phase and the V-phase, the same operation is performed, and thus the following description is directed only to the operation for the U-phase. In the U-phase ground fault detection circuit 12U of the U-phase short circuit detection circuit 10U, the negative-side input of the ground fault detection comparator 16U, i.e., the output terminal 3U, has substantially the same potential as that of the power source VM since the U-phase switching element 1U is turned ON. Since the voltage of the positive-side input is the power source VM/2, the output signal 20U is L. On the other hand, in the U-phase power supply fault detection circuit 13U, since the U-phase lower control signal 7U is L, the output signal 23U is L. Accordingly, the output signal 24U is also L, and the U-phase short circuit detection signal 11U is L.

As described above, since no ground fault is detected for the three phases in Step S4, the process proceeds to Step S5. In Step S5, the control circuit 20 makes the U-phase, V-phase, and W-phase upper control signals 6U, 6V, and 6W L so as to turn all the U-phase, V-phase, and W-phase upper switching elements 1U, 1V, and 1W OFF, and makes the U-phase, V-phase, and W-phase lower control signals 7U, 7V, and 7W H so as to turn the U-phase, V-phase, and W-phase lower switching elements 2U, 2V, and 2W ON.

At this time, in the W-phase power supply fault detection circuit 13W of the W-phase short circuit detection circuit 10W, since the positive-side input of the power supply fault detection comparator 18W, i.e., the output terminal 3W, is short-circuited to the power source VM, its voltage is VM. Since the voltage of the negative-side input is the power source VM/2, the output signal 21W is H. Consequently, since the AND circuit 19W receives the W-phase lower control signal 7W of H and the output signal 21W of H, the output signal 23W is H, which shows that a power supply fault is detected. Accordingly, the output signal 24 is also H, and the W-phase short circuit detection signal 11W of H, which shows that a power supply fault is detected, is output to the control circuit 20.

Consequently, the control circuit 20 is notified of the detection of a short circuit, and turns all the switching elements OFF (Step S8), thereby preventing a breakdown of the switching elements due to an excess current caused by the power supply fault.

As described above, according to the short circuit protection control device 18 of Embodiment 1, before energization of the motor drive windings 4U, 4V, and 4W is started, the presence of a power supply fault is checked with all the lower switching elements 2U, 2V, and 2W turned ON. This makes it possible to detect a power supply fault regardless of the resistance component of the motor drive windings to be driven, thereby protecting the switching elements from breakdowns. Further, since a power supply fault is detected before energization of the motor drive windings is started, the motor drive windings are prevented from being driven in an abnormal state where a power supply fault occurs, and abnormal energization also can be prevented.

EMBODIMENT 2

Figure 4:
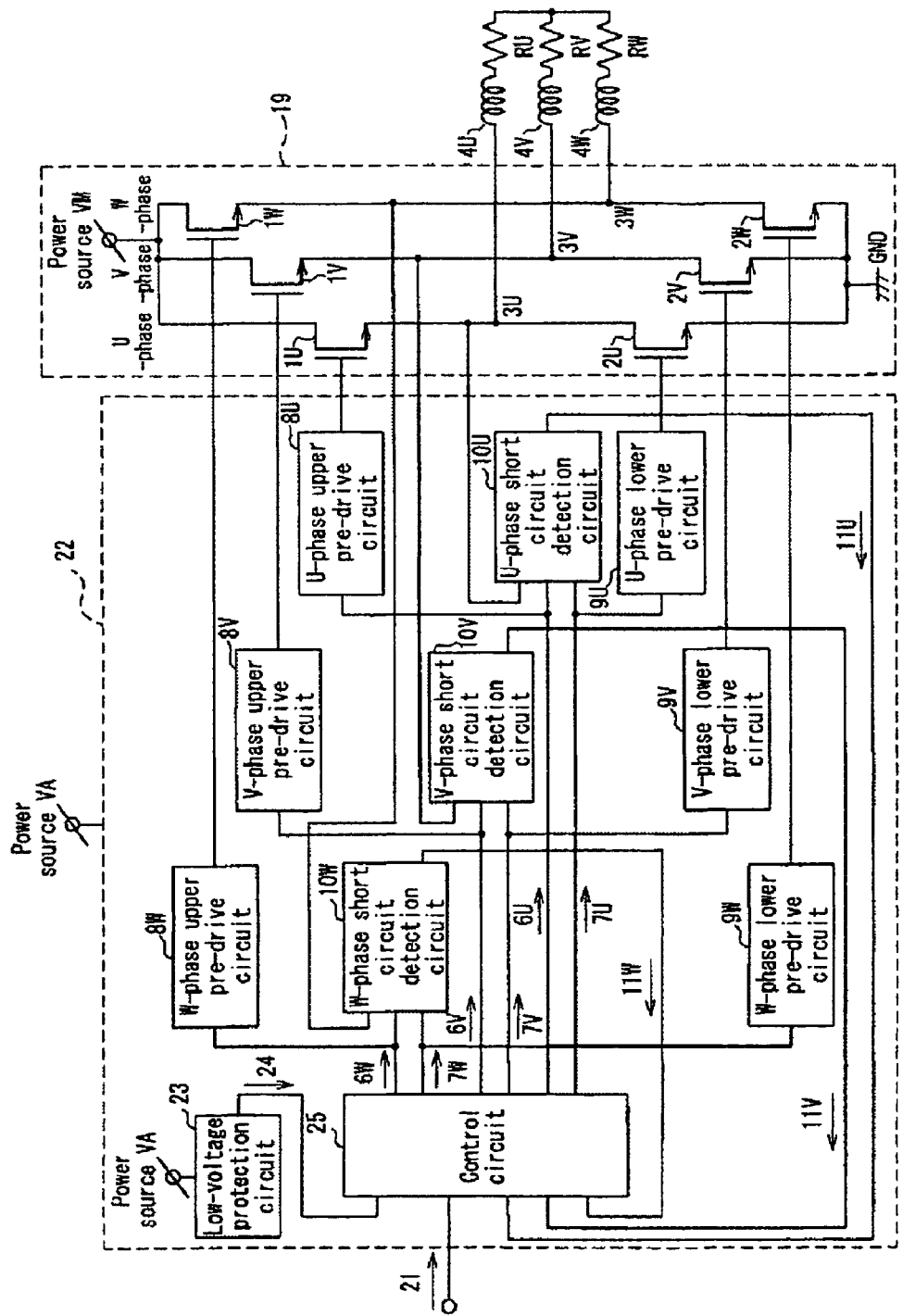
FIG. 4 is a block diagram showing an exemplary configuration of a power supply system according to Embodiment 2 of the present invention.

FIG. 4 is a block diagram showing an exemplary configuration of a short circuit protection control device 22 included in a power supply system according to Embodiment 2. The short circuit protection control device 22 has the same configuration as that in Embodiment 1 except that a low-voltage protection circuit 23 is added, so that an output signal 24 thereof is input to a control circuit 25. U-phase, V-phase, and W-phase short circuit detection circuits 10U, 10V, and 10W each have the same configuration and operation as those described with reference to FIG. 2, and thus descriptions thereof will not be repeated.

The low-voltage protection circuit 23 is supplied with a power source VA of the short circuit protection control device 22, and outputs the output signal 24 to the control circuit 25.

The low-voltage protection circuit 23 operates as follows. First, until the voltage of the power source VA is increased to a level that enables a stable operation of the short circuit protection control device 22, the low-voltage protection circuit 23 makes the output signal 24 L so as to perform a protection operation in which all the switching elements are turned OFF. When the voltage of the power source VA is increased to not less than the level that enables a stable operation of the short circuit protection control device 22, the low-voltage protection circuit 23 makes the output signal 24H so as to remove the protection, thereby enabling energization of motor drive windings 4U, 4V, and 4W.

Next, a description will be given of the control circuit 25. As shown in FIG. 4, the control circuit 25 receives the output signal 24 of the low-voltage protection circuit 23, an energization instruction 21 for starting energization of the motor drive windings 4U, 4V, and 4W, and U-phase, V-phase, and W-phase short circuit detection signals 11U, 11V, and 11W. Based on these input signals, the control circuit 25 outputs U-phase, V-phase, and W-phase upper control signals 6U, 6V, and 6W and U-phase, V-phase, and W-phase lower control signals 7U, 7V, and 7W so as to control ON/OFF of the switching elements.

Figure 5:
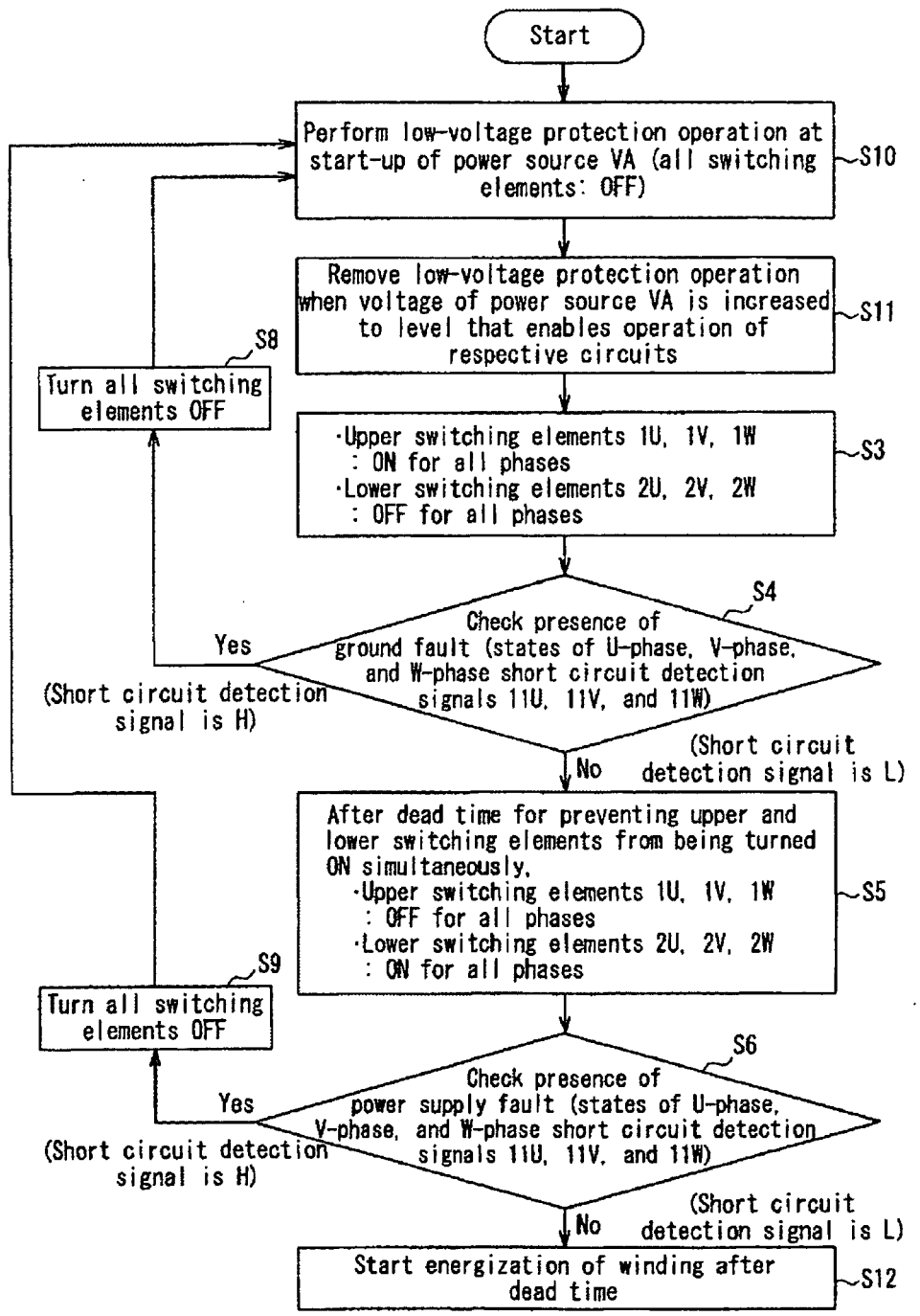
FIG. 5 is a flowchart showing a control operation of a control circuit 25 included in the power supply system.
Figure 6:
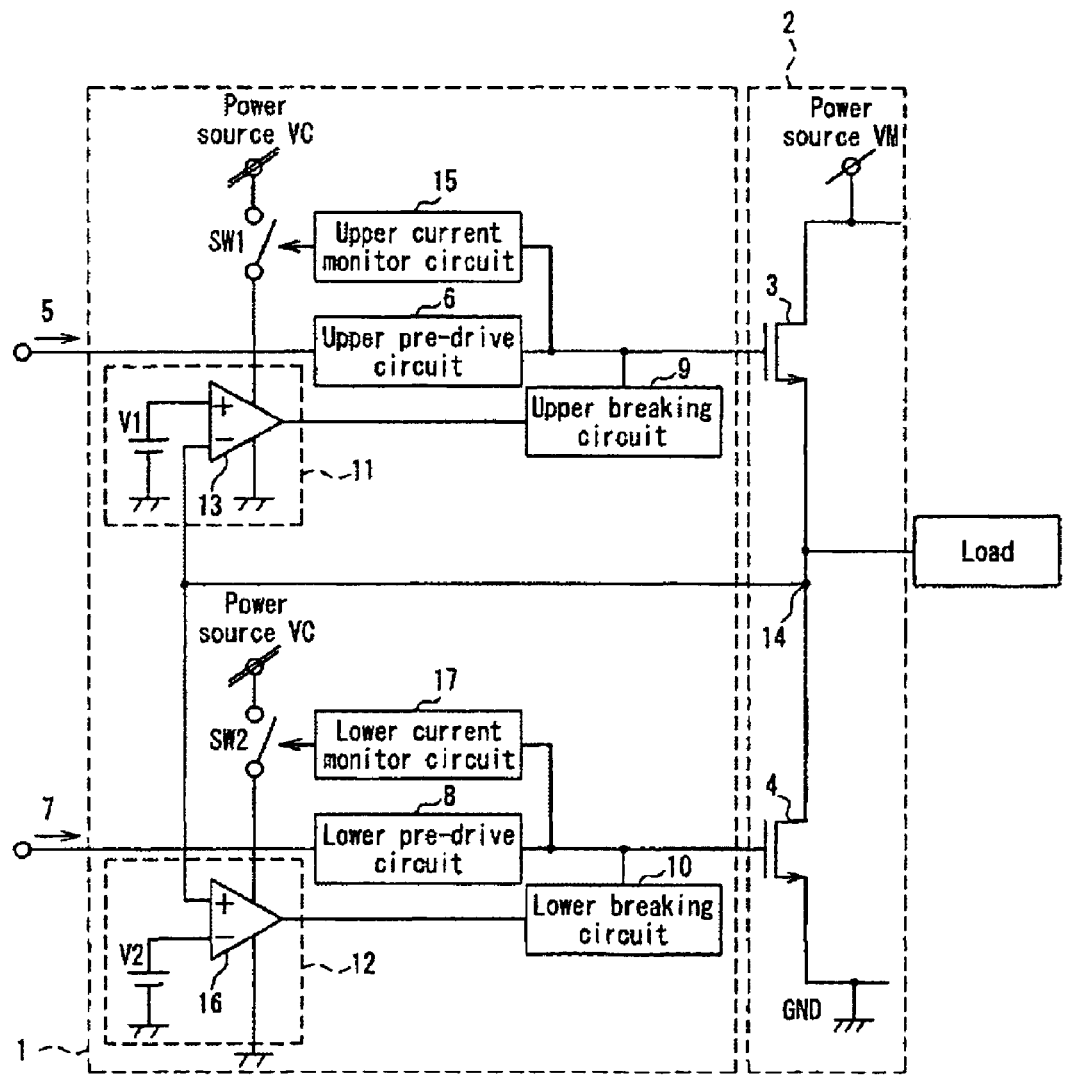
FIG. 6 is a block diagram of a power supply circuit showing an exemplary configuration of a conventional short circuit protection device.
Figure 7:
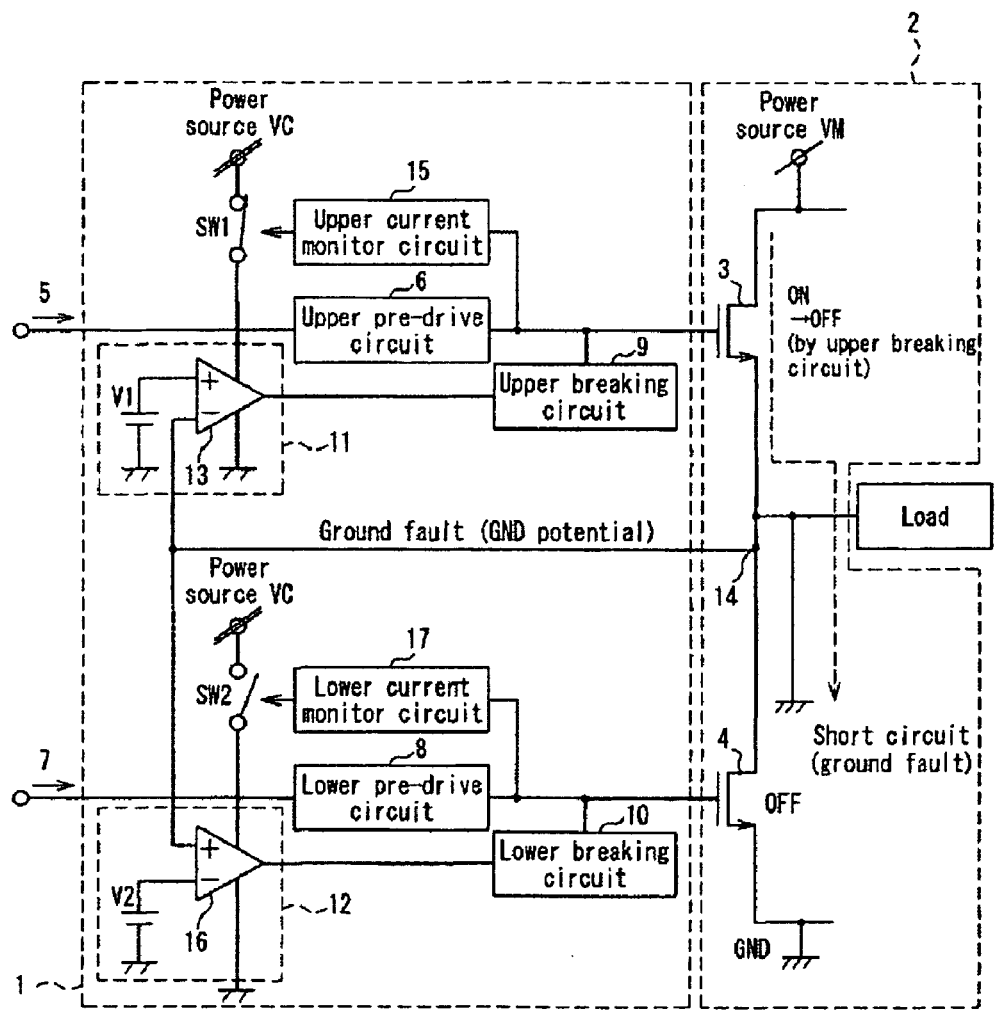
FIG. 7 is a block circuit diagram showing a state where an output is short-circuited to ground in the power supply circuit.
Figure 8:
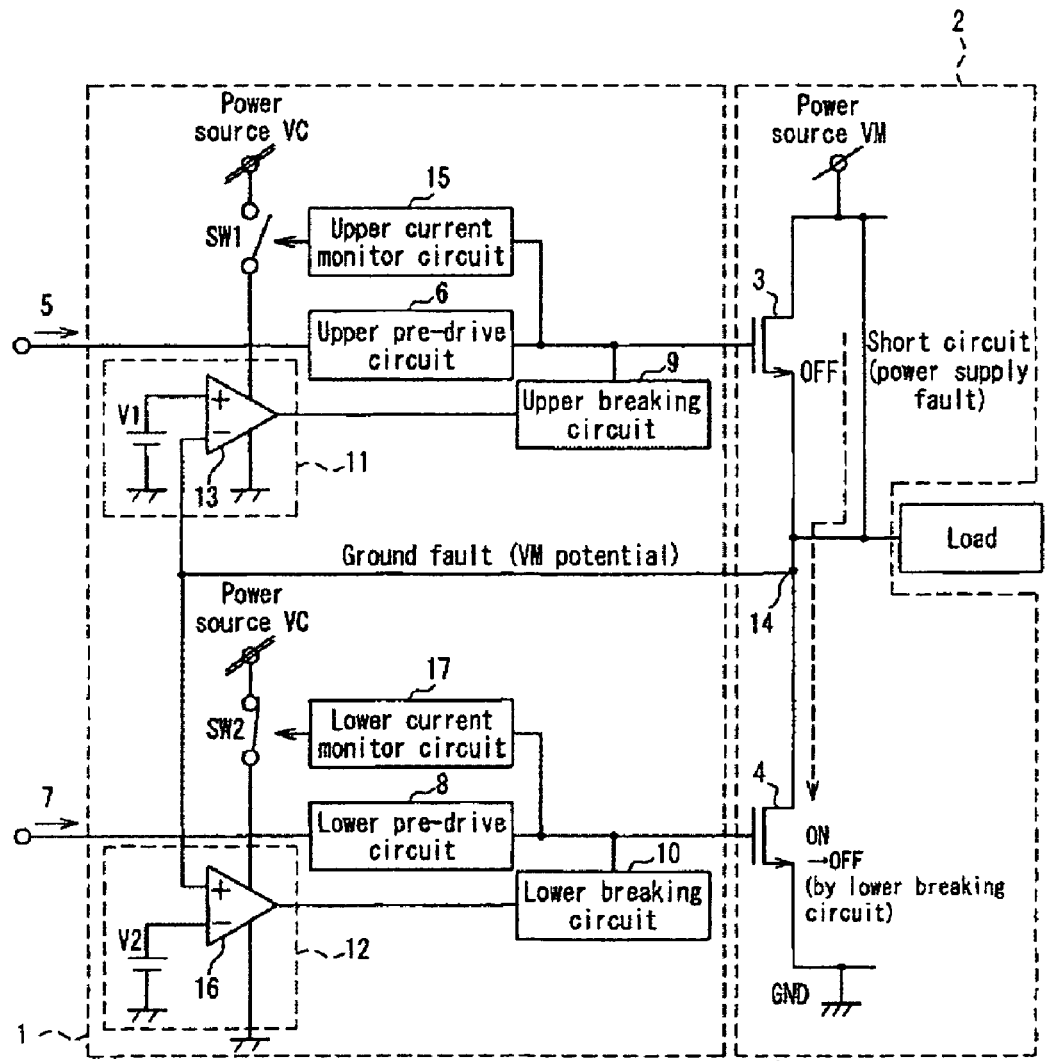
FIG. 8 is a block circuit diagram showing a state where an output is short-circuited to the power supply in the power supply circuit.
Figure 9:
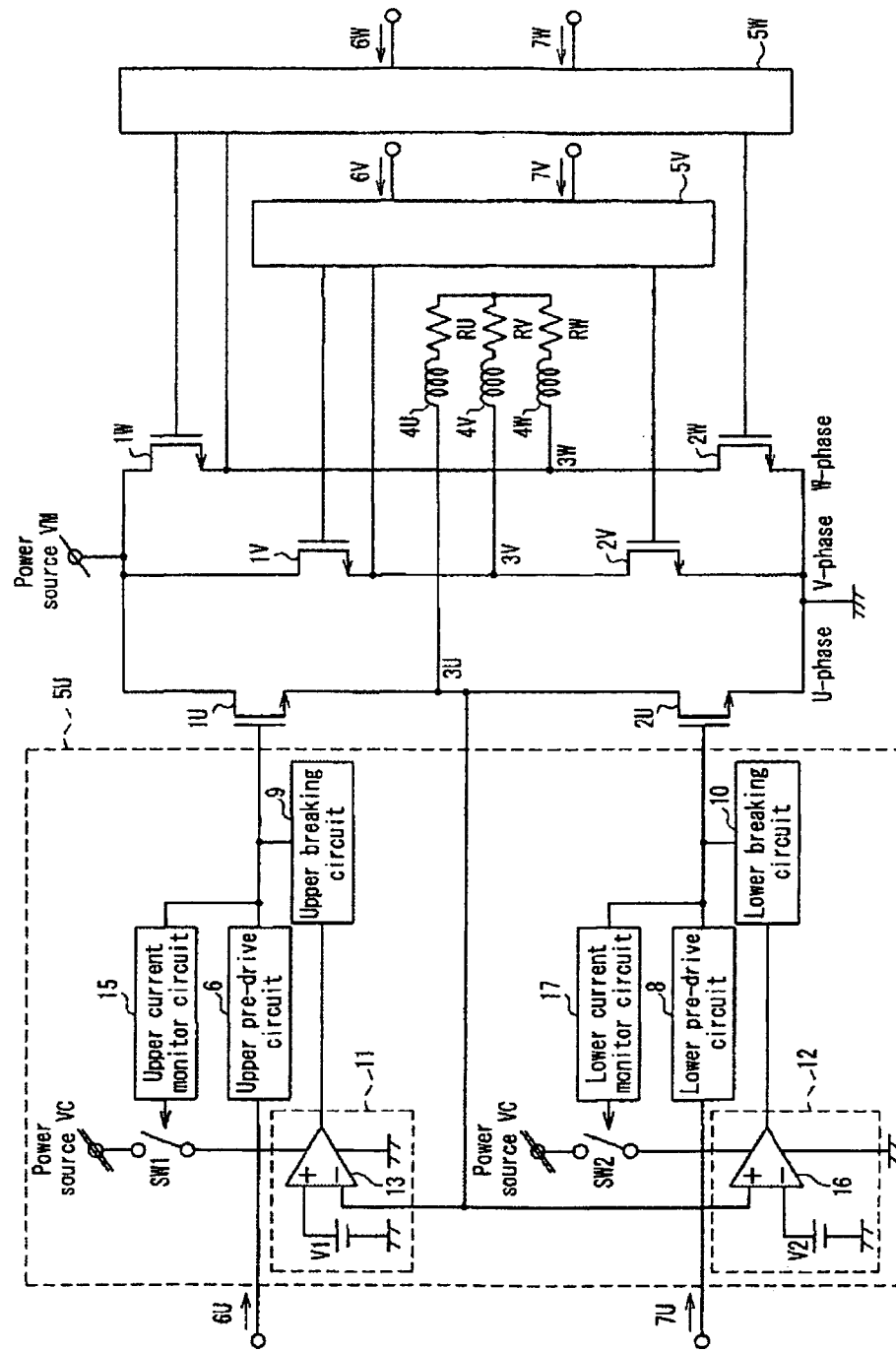
FIG. 9 is a block circuit diagram showing an exemplary configuration in the case where the circuit in FIG. 6 is applied to driving motor drive windings of three phases.
Figure 10:
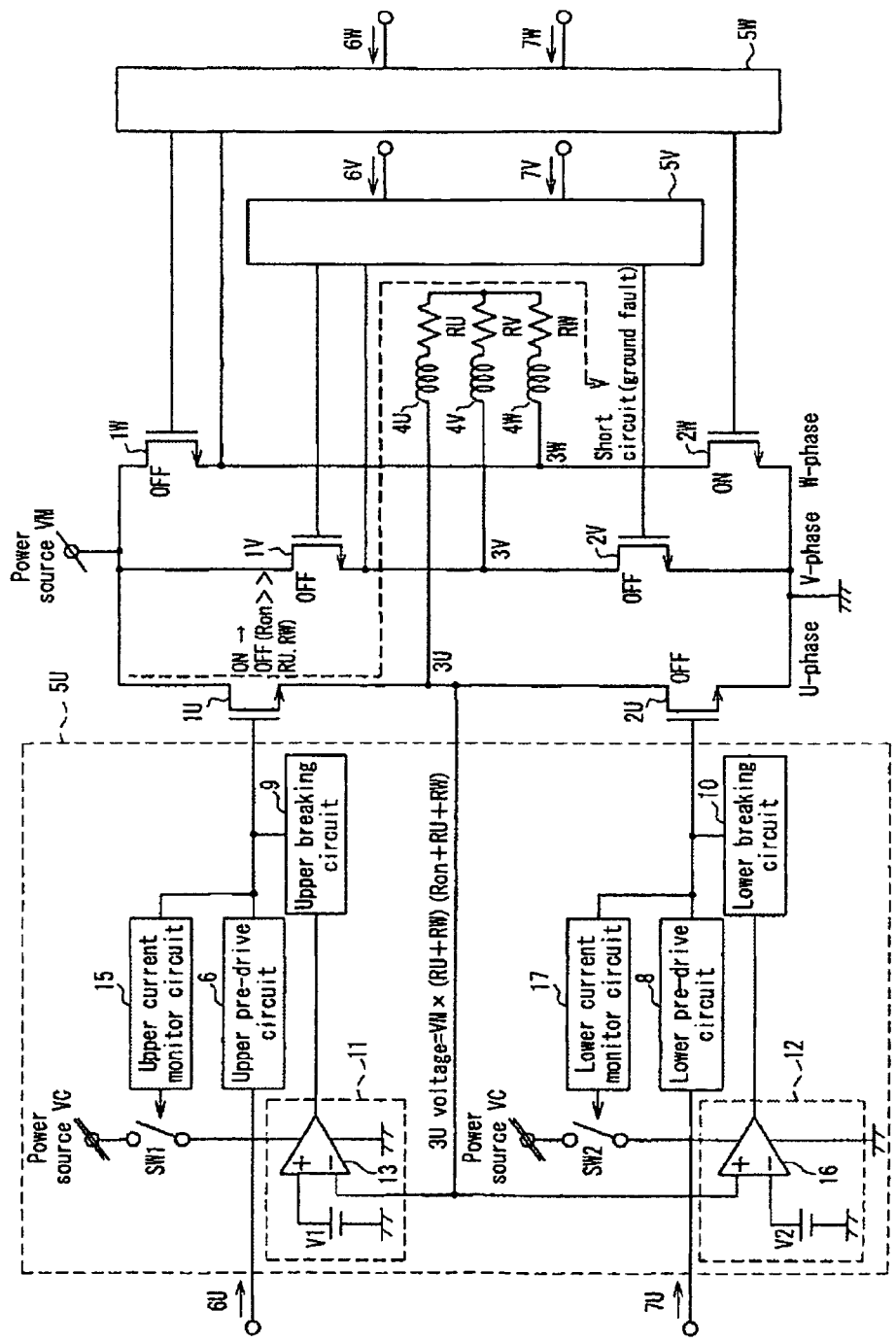
FIG. 10 is a block circuit diagram showing a state where a W-phase output terminal is short-circuited to ground in the circuit in FIG. 9.

The operation of the control circuit 25 will be described with reference to a flowchart shown in FIG. 5. Initially, the control circuit 25 starts up the power source VA of the short circuit protection control device 22 including the control circuit 25 from a voltage of 0, and turns all the switching elements OFF as a protection operation in accordance with the output of the low-voltage protection circuit 23 until the voltage of the power source VA is increased to a level that enables a stable operation of the short circuit protection control device 22 (Step S10). Then, when the voltage of the power source VA is increased to not less than the level that enables a stable operation of the short circuit protection control device 22, the control circuit 25 removes the low-voltage protection (Step S11).

Figure 2:
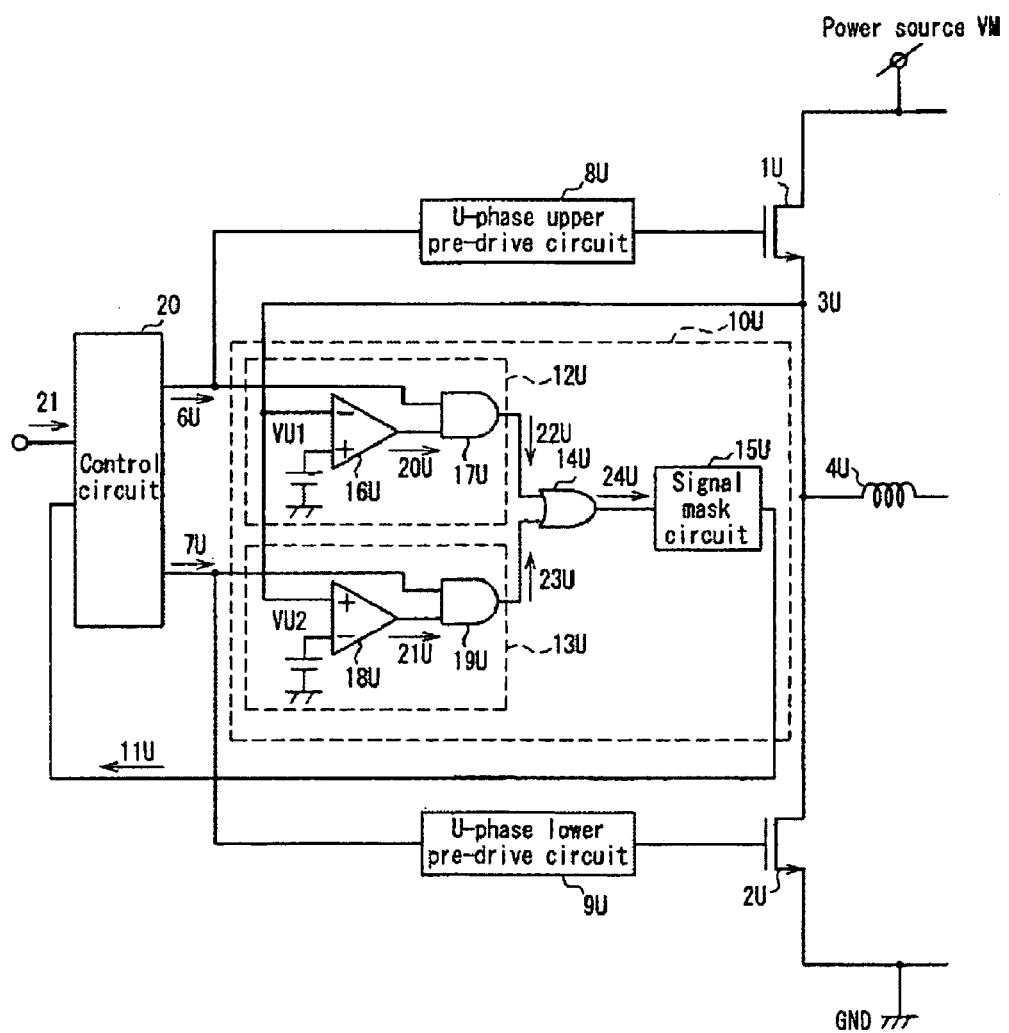
FIG. 2 is a block diagram showing a configuration of a U-phase short circuit detection circuit 10 included in the power supply system.

The remainder of the operation is the same as that in Embodiment 1 shown in FIG. 2. Namely, the control circuit 25 turns all the U-phase, V-phase, and W-phase upper switching elements 1U, 1V, and 1W ON and all the U-phase, V-phase, and W-phase lower switching elements 2U, 2V, and 2W OFF (Step S3). At this time, the U-phase, V-phase, and W-phase short circuit detection circuits 10U, 10V, and 10W check whether or not respective output terminals 3U, 3V, and 3W are short-circuited to ground (Step S4). When even only one ground fault is detected, in other words, when any of the U-phase, V-phase, and W-phase short circuit detection signals 11U, 11V, and 11W shows that a short circuit is detected, the control circuit 25 turns all the switching elements OFF (Step S8), so as to prevent a breakdown due to an excess current caused by the ground fault.

When no ground fault is detected, after a lapse of a dead time provided for preventing the upper and lower switching elements from being turned ON simultaneously, the control circuit 25 turns all the U-phase, V-phase, and W-phase upper switching elements 1U, 1V, and 1W OFF and all the U-phase, V-phase, and W-phase lower switching elements 2U, 2V, and 2W ON (Step S5). At this time, the U-phase, V-phase, and W-phase short circuit detection circuits 10U, 10V, and 10W check whether or not the respective output terminals 3U, 3V, and 3W are short-circuited to the power supply (Step S6). When even only one power supply fault is detected, in other words, when any of the U-phase, V-phase, and W-phase short circuit detection signals 11U, 11V, and 11W shows that a short circuit is detected, the control circuit 25 turns all the switching elements OFF (Step S9), so as to prevent a breakdown due to an excess current caused by the power supply fault. When no power supply fault is detected, it becomes possible to energize the motor drive windings based on the energization instruction 21 (Step S12).

The operation of the short circuit protection control circuit 22 of the present embodiment for solving the conventional problem is the same as that in Embodiment 1. Namely, in the case where the winding resistance RU or RW is sufficiently higher than the ON-resistance Ron of the U-phase upper switching element 1U, even when the output terminal 3W is short-circuited to ground, the ground fault cannot be detected, which causes an excess current to flow through the switching element continuously. The operation for solving this problem is the same as that in Embodiment 1, and thus a description thereof will not be repeated.

Embodiment 2 is characterized in that the presence of a short circuit is checked only when the power source VA is started up. In the case where the presence of a short circuit is checked every time the energization instruction 21 is input as in Embodiment 1, it takes a longer time to start the motor. In view of this, Embodiment 2 is useful when there is a strict requirement for the starting time of the motor.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A power supply system comprising:
    a pair or a plurality of pairs of an upper switching element and a lower switching element connected in series between power sources for sequentially energizing a motor drive winding of a single phase or a plurality of phases;
    a control circuit that starts outputting a control signal for controlling energization of the motor drive winding based on an energization instruction;
    a pre-drive circuit for controlling ON/OFF of the upper switching element and the lower switching element based on the control signal from the control circuit; and
    a short circuit detection circuit for detecting a short circuit in a node between the upper switching element and the lower switching element to a higher-potential power source or a lower-potential power source based on the control signal from the control circuit and a voltage of the node,
    wherein the short circuit detection circuit is controlled to perform at least one operation of:
    detecting a short circuit in the node to the lower-potential power source with all the upper switching element turned ON and all the lower switching element turned OFF; and
    detecting a short circuit in the node to the higher-potential power source with all the upper switching element turned OFF and all the lower switching element turned ON,
    in a state where the motor drive winding is not energized.

2. The power supply system according to claim 1, wherein when a short circuit in the node to the higher-potential power source or the lower-potential power source is detected, all the upper switching element and the lower switching element are turned OFF.

3. The power supply system according to claim 1, wherein when a short circuit in the node to the higher-potential power source or the lower-potential power source is detected, energization of the motor drive winding is prohibited.

4. The power supply system according to any one of claims 1, wherein before energization of the motor drive winding is started by the upper switching element and the lower switching element, the short circuit detection circuit detects short circuits in the node to the higher-potential power source and the lower-potential power source.

5. The power supply system according to claim 1, further comprising a protection circuit that turns all the upper switching element and the lower switching element OFF until a voltage of a power source of a short circuit protection control device including the control circuit, the pre-drive circuit, and the short circuit detection circuit is increased to an arbitrary voltage V1, wherein when the voltage of the power source of the short circuit protection control device is increased to not less than the arbitrary voltage V1, the short circuit detection circuit is controlled to perform at least one operation of:

detecting a short circuit in the node to the lower-potential power source; and detecting a short circuit in the node to the higher-potential power source.

6. The power supply system according to claim 5, wherein when a short circuit in the node to the higher-potential power source or the lower-potential power source is detected, all the upper switching element and the lower switching element are turned OFF.

7. The power supply system according to claim 5, wherein when a short circuit in the node to the higher-potential power source or the lower-potential power source is detected, energization of the motor drive winding is prohibited.

* * * * *